(12) United States Patent
Kwon

(10) Patent No.: US 10,974,685 B2
(45) Date of Patent: Apr. 13, 2021

(54) AIRBAG FOR VEHICLE

(71) Applicants: Hyundai Motor Company, Seoul (KR); Kia Motors Corporation, Seoul (KR)

(72) Inventor: Hyock In Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 127 days.

(21) Appl. No.: 16/165,318

(22) Filed: Oct. 19, 2018

(65) Prior Publication Data

US 2019/0381968 A1 Dec. 19, 2019

(30) Foreign Application Priority Data

Jun. 18, 2018 (KR) ........................ 10-2018-0069475

(51) Int. Cl.
| | |
|---|---|
| *B60R 21/2338* | (2011.01) |
| *B60R 21/214* | (2011.01) |
| *B60R 21/26* | (2011.01) |
| *B60R 21/216* | (2011.01) |
| *B60R 21/013* | (2006.01) |
| *B60R 21/233* | (2006.01) |
| *B60N 2/04* | (2006.01) |
| *B60R 21/239* | (2006.01) |
| *B60R 21/231* | (2011.01) |
| *B60R 21/00* | (2006.01) |

(52) U.S. Cl.
CPC ............ *B60R 21/2338* (2013.01); *B60N 2/04* (2013.01); *B60R 21/013* (2013.01); *B60R 21/214* (2013.01); *B60R 21/216* (2013.01); *B60R 21/233* (2013.01); *B60R 21/239* (2013.01); *B60R 21/26* (2013.01); *B60R 2021/0032* (2013.01); *B60R 2021/23161* (2013.01)

(58) Field of Classification Search
CPC ... B60R 21/2338; B60R 21/214; B60R 21/26; B60R 21/216; B60R 21/013; B60R 21/233; B60R 21/239; B60R 2021/23161; B60R 2021/0032; B60N 2/04
See application file for complete search history.

(56) References Cited

U.S. PATENT DOCUMENTS

| | | | | |
|---|---|---|---|---|
| 3,753,576 | A * | 8/1973 | Gorman ................ | B60R 21/207 280/730.1 |
| 6,913,280 | B2 * | 7/2005 | Dominissini ......... | B60R 21/213 280/728.2 |
| 7,878,531 | B2 * | 2/2011 | Sugimoto ............. | B60R 21/207 280/730.1 |
| 9,428,138 | B2 * | 8/2016 | Farooq ................ | B60R 21/2338 |
| 9,944,246 | B2 * | 4/2018 | Ohno ................ | B60R 21/23138 |
| 10,471,923 | B2 * | 11/2019 | Jimenez ................ | B60R 21/232 |

(Continued)

FOREIGN PATENT DOCUMENTS

KR 10-2010-0120400 A 11/2010

*Primary Examiner* — Darlene P Condra
(74) *Attorney, Agent, or Firm* — Mintz Levin Cohn Ferris Glovsky and Popeo, P.C.; Peter F. Corless

(57) ABSTRACT

The present disclosure provides an airbag for a vehicle. The airbag safely supports a passenger after deploying forward from behind a passenger in a seat. Additionally, the airbag is able to be changed in position to safely protect a passenger by changing the position even when the position of a seat is changed.

16 Claims, 10 Drawing Sheets

(56) References Cited

U.S. PATENT DOCUMENTS

| | | | |
|---|---|---|---|
| 10,730,470 B2* | 8/2020 | Choi | B60R 21/214 |
| 2016/0347272 A1* | 12/2016 | Kato | B60R 21/207 |
| 2017/0028955 A1* | 2/2017 | Ohno | B60R 21/207 |
| 2017/0136976 A1* | 5/2017 | Ohno | B60R 21/262 |
| 2017/0347272 A1* | 11/2017 | Ahmavaara | H04W 16/14 |
| 2018/0222432 A1* | 8/2018 | Schneider | B60R 21/261 |
| 2018/0236962 A1* | 8/2018 | Ohno | B60R 21/207 |
| 2019/0016288 A1* | 1/2019 | Schneider | B60R 21/18 |
| 2019/0031132 A1* | 1/2019 | Dry | B60R 21/207 |
| 2019/0031133 A1* | 1/2019 | Dry | B60R 21/2338 |
| 2019/0248322 A1* | 8/2019 | Herzenstiel | B60R 21/18 |
| 2019/0291678 A1* | 9/2019 | Cho | B60R 21/207 |
| 2019/0347272 A1* | 11/2019 | Varadarajan | G06F 16/188 |

* cited by examiner

AIRBAG FOR VEHICLE

CROSS-REFERENCE TO RELATED APPLICATION

This application claims the priority benefit of Korean Patent Application No. 10-2018-0069475, filed on Jun. 18, 2018, the disclosure of which is incorporated herein by reference.

BACKGROUND

1. Field of the Invention

The present disclosure relates to an airbag for a vehicle, and more particularly, to an airbag for a vehicle that improved airbag safety of a passenger in the vehicle.

2. Description of the Prior Art

Technologies for securing drivability, convenience, and functionality of a vehicle and safety of passengers have been developed. In particular, an airbag, one of various automotive safety devices, is used as a device that protects a passenger from shock during a vehicle collision.

In particular, an airbag is a device that protects a driver or a passenger during a vehicle collision and includes a collision sensor that senses the collision, a controller that operates the airbag based on the sensing result of the collision sensor, and an airbag module that operates the airbag in response to a signal from a controller. Airbags are classified into a driver airbag, passenger airbag, a side airbag, a roof airbag, etc., depending on the installation position and the object to be protected.

However, a roof airbag mounted on the roof of a vehicle to restrict movement of a passenger is unable to stably restrain a passenger since the roof airbag rotates on the installation point when the passenger is loaded on it. Further, as self-driving vehicles are developed, the positions of seats will be able to be freely changed, but the development of airbags that stably protect passengers when the position of a seat is changed remain insufficient.

The description provided above as a related art of the present disclosure is just for helping to understand the background of the present disclosure and should not be construed as being included in the related art known by those skilled in the art.

SUMMARY

The present disclosure provides an airbag for a vehicle, the airbag being able to stably protect a passenger by maintaining the passenger in a seat and being able to change a deployment position in accordance with the position of a seat.

In accordance with an aspect of the present disclosure, an airbag for a vehicle may include a protective airbag, wherein the protective airbag may include: a main chamber disposed above and behind a seat, having a first end connected to an inflator to deploy forward from the seat when the inflator is operated, and having a second end bending downward to position the main chamber in front of a passenger in the seat when the main chamber fully deploys; and a side chamber having a first end connected to the first end of the main chamber to be positioned at a side of the main chamber when the inflator is operated and having a second end connected to the second end of the main chamber so that the main chamber supports the passenger in front of the passenger, by pulling the second end of the main chamber rearward when the main chamber deploys.

The main chamber may be elongated within the second end bending downward when the main chamber fully deploys reaches the lower body of the passenger in the seat. The side chamber may be formed with a shorter length than the main chamber and the second end of the side chamber may be connected to the second end of the main chamber, and thus, the side chamber may be positioned at a side of the passenger when the main chamber fully deploys. The airbag may further include an airbag housing disposed above and behind the seat, maintaining the protective airbag connected to the inflator therein, and having a guide door opened by deployment force of the protective airbag when the inflator is operated.

The guide door may be configured to be rotatable at a front lower end of the airbag housing, and may guide the protective airbag under the protective airbag to deploy in a front direction of the vehicle when the protective airbag deploys. The airbag housing may be fixed to a roof frame and may be elongated to be as long as a lateral width of the seat. The first end of the main chamber and the first end of the side chamber may be connected to each other through a vent, and an active vent portion may be disposed at the vent to selectively open the vent that is closed.

The airbag may further include a controller configured to receive car collision information and operate the active vent portion. When the controller receives a front-rear collision signal, the controller may be configured to operate the active vent portion to open the vent after the main chamber deploys, whereby the side chamber may deploy later. When the controller receives a lateral collision signal, the controller may be configured to operate the active vent portion to open the vent to cause the main chamber and the side chamber to deploy simultaneously.

The active vent portion may include: a cover that covers and closes the vent; a wire connected to the cover and holding the cover to cover the vent; and a cutter disposed on a vehicle body or the protective airbag and operated by the controller to cut the wire. One or more partition chambers separating several passengers in seats may be formed at the center of the main chamber and may be connected to the main chamber to expand with the main chamber when the main chamber expands.

The airbag may further include: a retaining tether having a first end connected and fixed to a vehicle body or the first end of the main chamber and a second end connected to the second end of the main chamber to deploy the main chamber downward when the protective airbag deploys; and a tether cutter disposed on the vehicle body or the main chamber to selectively cut the retaining tether.

The seat may be configured to be adjustable either to face in a front direction or in a rear of the vehicle. The tether cutter may be operated by the controller that receives seat information, and thus, when the seat is adjusted to face in the front direction of the vehicle, the controller may be configured to operate the tether cutter to cut the retaining tether. When the seat is adjusted to face rear, the controller may be configured to prevent the tether cutter from operate to deploy the main chamber downward by the retaining tether, whereby the main chamber may be positioned in front of the passenger in the seat adjusted to face in the rear direction of the vehicle.

A plurality of seats a plurality of seats may be disposed in front and back directions of the vehicle. Each of the plurality of seats may be configured to be adjustable either to face in a front direction or in a rear direction of the vehicle. The plurality of seats may be arranged such that a front seat and rear seat and face each other. The protective airbag may be disposed above and behind the rear seat. The airbag may further include an additional airbag disposed above and ahead of the front seat, expanding to deploy rearward, and supporting a passenger in the front seat in front of the passenger.

The additional airbag may include: an additional main chamber disposed above and ahead of the front seat and having a first end connected to an inflator to deploy behind a seat when the inflator is operated and a second end bending downward to be positioned in front of the passenger in the front seat when fully deploying; and an additional side chamber having a first end that communicates with the first end of the additional main chamber to be positioned at a side of the additional main chamber when the inflator is operated and a second end connected to the second end of the additional main chamber and pulling the second end of the additional main chamber forward when the additional main chamber deploys such that the additional main chamber supports the passenger in the front seat in front of the passenger.

The airbag may further include: an additional retaining tether having a first end connected to a vehicle body or the first end of the additional main chamber and a second end connected to the second end of the additional main chamber to cause the additional main chamber to deploy downward when the additional airbag deploys; and an additional tether cutter disposed on the vehicle body or the additional main chamber to cut the additional retaining tether.

The additional tether cutter may be operated by the controller receiving seat information. When the front seat is adjusted to face in the rear direction of the vehicle, the controller may be configured to operate the additional tether cutter to cut the additional retaining tether. When the front seat is adjusted to face in the front direction of the vehicle, the controller may be configured to prevent the operation of the additional tether cutter, and thus, the additional main chamber may be retained by the additional retaining tether to be positioned in front of the passenger in the front seat.

The airbag for a vehicle having the structure described above may support a passenger after deploying forward from behind the passenger in a seat, and positions of the airbag may be changed to safely protect a passenger, even if a seated position of the passenger is changed due to change of position of the seat.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An airbag for a vehicle according to exemplary embodiments of the present disclosure is described hereafter with reference to the accompanying drawings.

Figure 1:
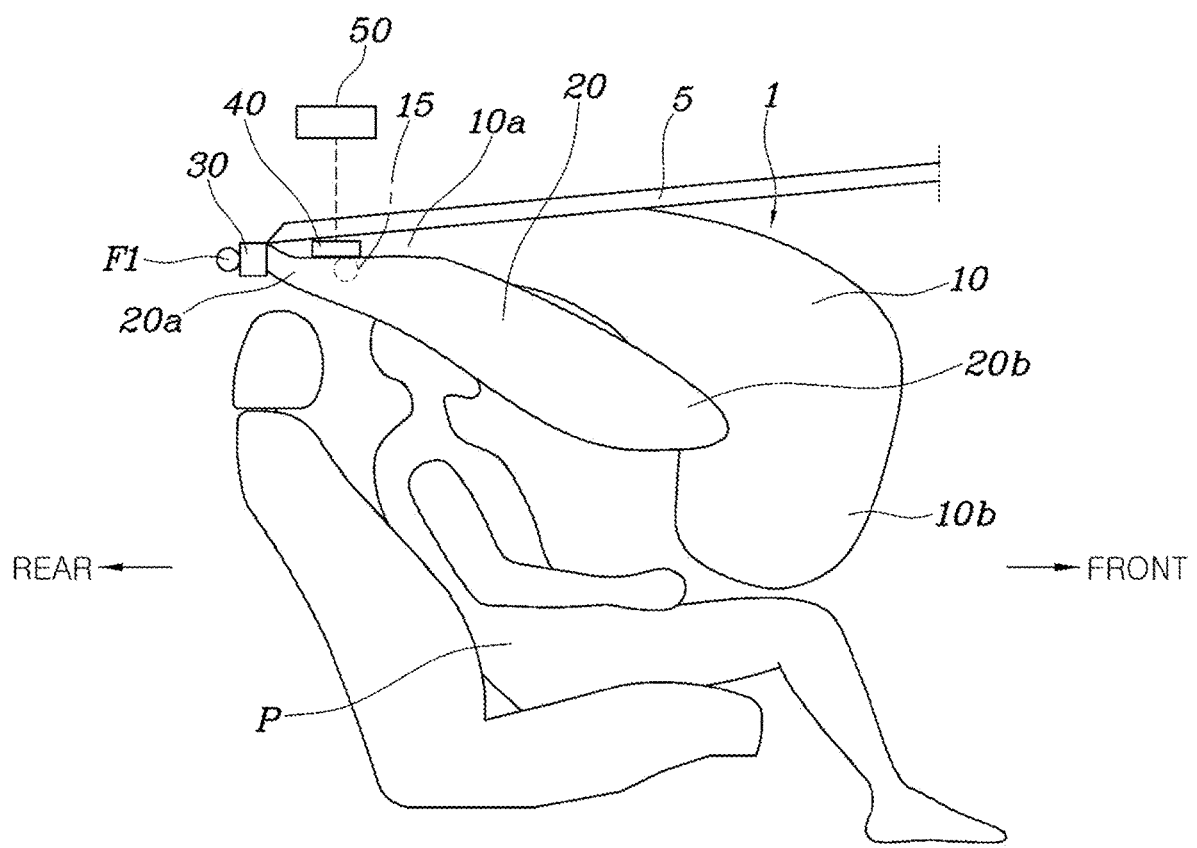
FIG. 1 is a view showing an airbag for a vehicle according to an exemplary embodiment of the present disclosure.
Figure 2:
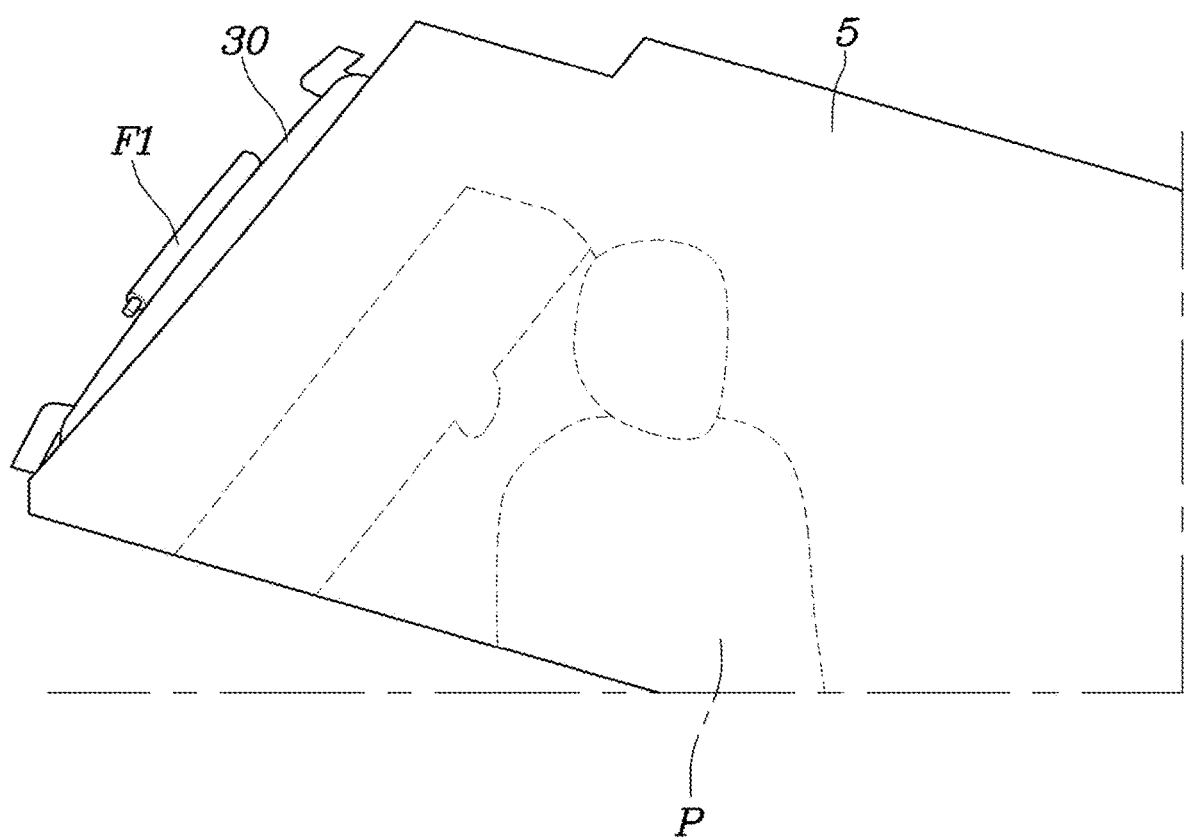
FIGS. 2 and 3 are views illustrating the airbag for a vehicle shown in FIG. 1 according to an exemplary embodiment of the present disclosure.
Figure 3:
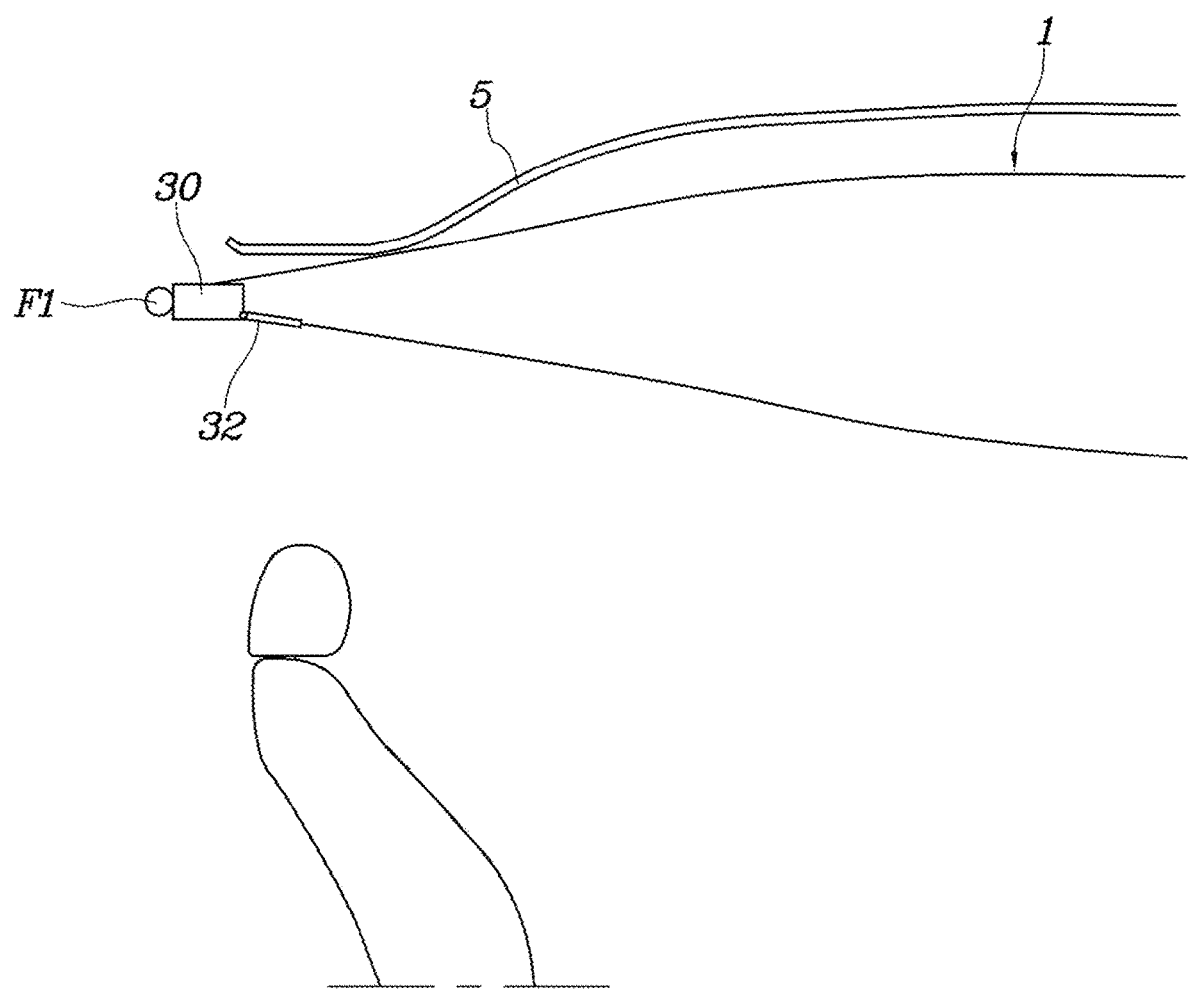
Figure 4:
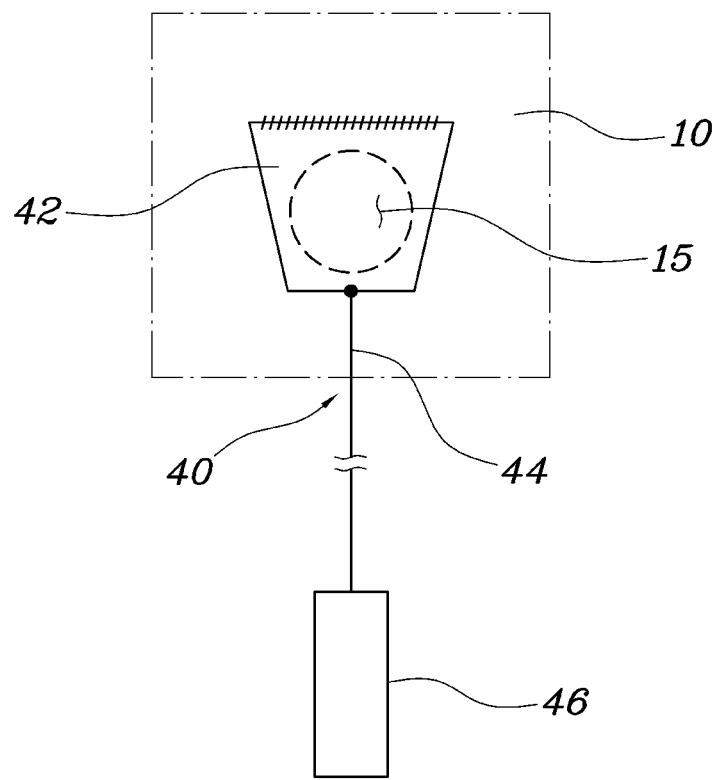
FIGS. 4 through 11 are views showing various exemplary embodiments of the airbag for a vehicle shown in FIG. 1.
Figure 11:
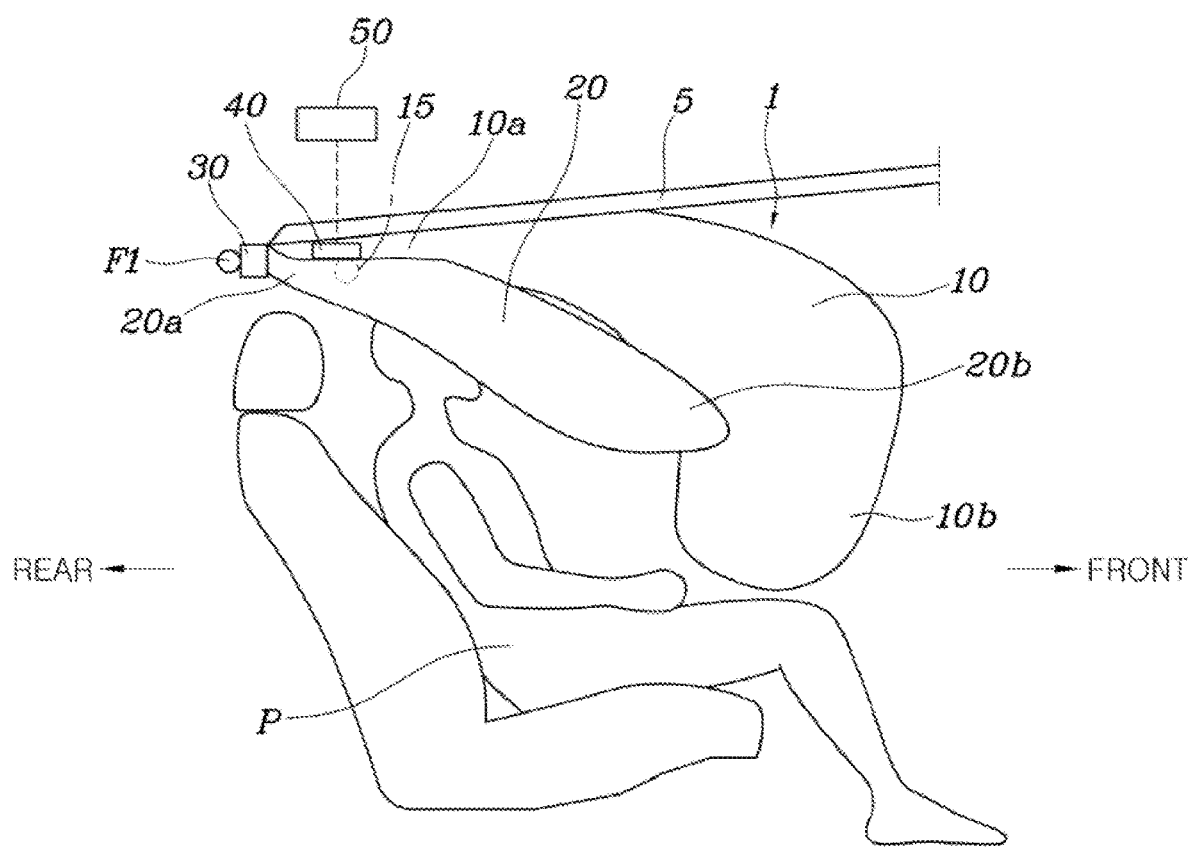

FIG. 1 is a view showing an airbag for a vehicle of the present disclosure, FIGS. 2 and 3 are views illustrating the airbag for a vehicle shown in FIG. 1, and FIGS. 4 and 11 are views showing various exemplary embodiments of the airbag for a vehicle shown in FIG. 1.

An airbag for a vehicle according to the present disclosure, as shown in FIG. 1, may include a protective airbag 1 having: a main chamber 10 disposed above and behind a seat, having a first end 10a connected to an inflator F1 to deploy forward from the seat when the inflator F1 is operated, and having a second end 10b bending downward to position the main chamber 10 in front of a passenger P in the seat when fully deployed; and a side chamber 20 having a first end 20a connected to the first end 10a of the main chamber 10 to be positioned at a side of the main chamber 10 when the inflator F1 is operated and having a second end 20b connected to the second end 10b of the main chamber 10 so that the main chamber 10 supports the passenger P in front of the passenger P, by pulling the second end 10b of the main chamber 10 rearward when the main chamber 10 deploys.

As described above, the protective airbag 1 of the present disclosure may include the main chamber 10 and a side chamber 20, in which the main chamber deploys forward ahead of the passenger P from the upward-rearward side of the seat, thereby absorbing impact applied to the passenger P and preventing the passenger P from lurching forward due to impact. In other words, the main chamber 10 may have the first end 10a fixed above and behind the seat and connected to the inflator F1 to be supplied with gas, and thus, when the main chamber 10 fully deploys, the second end 10b may bend downward ahead of the passenger P sitting in the seat to thus protect the passenger P.

The side chamber 20 may be disposed at a side of the main chamber 10. The side chamber 20 may have the first end 20a connected to the first end 10a of the main chamber 10 to be supplied with and expanded by gas from the inflator F1 and may have the second end 20b connected to the second end 10b of the main chamber 10 to guide the main chamber 10 in a predetermined shape when the main chamber 10 fully deploys. Accordingly, the side chamber 20 may be formed with a shorter length than the main chamber 10. Further, the side chamber 20 connected to the main chamber 10 may restrain forward deployment of the main chamber 10 and may pull the main chamber 10 rearward when the main chamber 10 deploys forward, whereby the second end 10b of the main chamber 10 may be bent rearward and support the passenger P.

Accordingly, even if the passenger P lurches forward from the seat in a vehicle collision, the main chamber 10 deploying forward from behind the seat may be positioned in front of the passenger P and the side member 20 may the main chamber 10 rearward, thereby supporting the main chamber 10. Therefore, the passenger P loaded to the main chamber 10 may be more stably restrained in the seat. According to the present disclosure, in detail, as shown in FIG. 1, the main chamber 10 may be elongated such that the second end 10b bending downward when the main chamber 10 fully deploys may reach the lower body of the passenger P in the seat.

In other words, when the main chamber 10 fully deploys, it may be positioned in front of the passenger P with the second end 10b bending downward and the main chamber 10 may be elongated to reach the passenger P in the seat when fully deployed. Accordingly, the second end 10b of the main chamber 10 may cover the passenger P and fix the lower body of the passenger P, thereby preventing excessive movement of the passenger P.

The side chamber 20 may be formed shorter than the main chamber 10 and the second end 20b of the side chamber 20 may be connected to the second end 10b of the main chamber 10, and thus, the side chamber 20 may be positioned at a side of the passenger P when fully deployed. In other words, in the present disclosure, since the first end 20a of the side chamber 20 may be connected to the first end 10a of the main chamber 10 and the second end of the side chamber 20 may be connected to the second end of the main chamber 10, when the side chamber 20 is formed shorter than the main chamber 10, forward deployment of the main chamber 10 may be restricted by the side chamber 20 such that the second end 10b of the main chamber 10 is pulled rearward and bent downward.

Furthermore, when the main chamber 10 fully deploys, the second end 10b bends downward and the main chamber 10 may be positioned in front of the passenger P in the seat, and the second end 20b of the side chamber 20 may be connected to the second end 10b of the main chamber 10, and thus, the side chamber 20 may be positioned at a side of the passenger P when the main chamber 10 fully deploys. Accordingly, when the protective airbag 1 deploys, the main chamber 10 may be positioned in front of the passenger P and the side chamber 20 may be positioned at a side of the passenger P to cover the passenger P, whereby the passenger P may be restrained in the seat and protected by the protective airbag 1.

On the other hand, as shown in FIGS. 2 and 3, the airbag may further include an airbag housing 30 disposed above and behind the seat, maintaining the connection of the protective airbag 1 to the inflator F1, and having a guide door 32 opened by deployment force of the protective airbag 1 when the inflator F1 is operated. In other words, the protective airbag 1 may be disposed in the airbag housing 30 disposed above and behind the seat and the airbag housing 30 has the guide door 32, and thus, the protective airbag 1 may deploy while opening the guide door 32. The inflator F1 may be coupled to the airbag housing 30, and the guide door 32 may be hinged to the airbag housing 30 to prevent the guide door 32 from being separated from the airbag housing 30 due to the deployment force of the protective airbag 1.

The airbag housing 30 may be fixed to a roof frame 5 and may be elongated to be as long as the width of the seat. In other words, as shown in FIG. 2, the airbag housing 30 may be disposed above and behind the seat by being fixed to the roof frame 5 and may be elongated to be as long as the lateral width of the seat, and thus, the protective airbag 1 may be received in the airbag housing 30 to be able to cover the seat when deployed. Accordingly, when the protective airbag 1 deploys out of the airbag housing 30, it covers the seat, and may rapidly cover and protect the passenger P in the seat.

In particular, as shown in FIG. 3, the guide door 32 on the airbag housing 30 may rotate on the front lower end of the airbag housing 30, and thus, the guide door 32 may guide the protective airbag 1 under the protective airbag 1 to deploy the protective airbag 1 in a front direction. Since the guide door 32 may be rotatably disposed on the front lower end of the airbag housing 30, when the protective airbag 1 deploys, the guide door 32 may be rotated under the front end of the protective airbag 1, and thus, the protective airbag 1 may be guided to deploy upward along the roof.

Accordingly, when the protective airbag 1 deploys out of the airbag housing 30, the protective airbag 1 may be guided and deployed over the seat by the guide door 32, and thus, the protective airbag 1 may move ahead of the passenger P without interfering with the passenger P in the seat. On the other hand, according to an exemplary embodiment of the present disclosure, as shown in FIG. 4, the first end 10a of the main chamber 10 and the first end 20b of the side chamber 20 may be connected to each other through a vent 15 and an active vent portion 40 may be disposed on the vent 15 to selectively open the vent 15 that is closed.

As described above, since the main chamber 10 and the side chamber 20 may be connected to each other through the vent 15, the gas supplied into the main chamber 10 from the inflator F1 may flow into the side chamber 20. In particular, since the active vent portion 50 may be disposed on the vent 15 and the vent 15 may be selectively opened, the expansion timing of the side chamber 20 may be changed. In other words, when the vent 15 is closed by the active vent portion 40, the gas supplied from the inflator F1 may be supplied only to the main chamber 10, and thus, only the main chamber 10 may be rapidly deployed. When the active vent portion 40 opens the vent 15, the gas supplied from the inflator F1 may be supplied to both the main chamber 10 and the side chamber 20, and thus, both the main chamber 10 and the side chamber 20 may expand.

Accordingly, the active vent portion 40 may include a cover 42 that covers and closes the vent 15, a wire 44 connected to the cover 42 and holding the cover 42 to cover the vent 15, and a cutter 46 disposed on a vehicle body or the protective airbag 1 and operated by the controller 50 to cut the wire 44. The cover 42 may be fixed on a side to the main chamber 10 by sewing and may be connected with the wire 44 on the opposite side, and thus, when the cover 42 is pulled the vent 15 is covered by the cover 42. The wire 44 may be cut by the cutter 46, and when the controller 50 operates the cutter 46 to cut the wire 44, the pulling force applied to the cover 42 may be removed and the vent 15 may be opened, so gas may flow through the vent 15.

Meanwhile, the airbag of the present disclosure may further include a controller 50 configured to operate the active vent portion 40 to adjust the deployment timing of the side chamber 20. In particular, when receiving a front-rear collision signal, the controller 50 may be configured to operate the active vent portion 40 to deploy the main chamber 10 first and then open the vent 15, whereby the side chamber 20 may deploy later.

The controller 50 in the exemplary embodiment may be configured to estimate whether the subject vehicle will collide with another nearby vehicle by collecting information from a camera, a laser, and an acceleration sensor, and may be configured to determine whether there is a collision through an impact sensor. When determining that the subject vehicle will collide with another vehicle in the front-rear direction, the controller 50 may be configured to operate the active vent portion 40 to delay opening of the vent 15 such that the main chamber 10 is sufficiently supplied with gas and deploys first, the vent 15 is opened, and then the gas may be supplied into the side chamber 20, whereby the side chamber 20 may deploy later.

For example, in a front collision of the vehicle, the passenger P lurches forward due to inertia, and thus rapid restraint of the forward movement of the passenger P is required. Accordingly, when a front collision of a vehicle is expected, the vent 15 may remain closed to allow the main chamber 10 to rapidly deploy forward and then the vent 15 may be opened to allow the side chamber 20 expand with the main chamber 10. Accordingly, the main chamber 10 may be pulled rearward by the side chamber 20 and the passenger P may be stably restrained and lateral movement of the passenger P may be prevented by the side chamber 20.

When receiving a lateral collision signal, the controller 50 may be configured to operate the active vent portion 40 to open the vent 15 to allow the main chamber 10 and the side chamber 20 to deploy simultaneously. In other words, the passenger P may be moved laterally from the seat in a lateral collision of the vehicle, and thus, the passenger P may be rapidly covered with the main chamber 10 and the side chamber 20 by immediately opening the vent 15 to allow the main chamber 10 and the side chamber 20 to open simultaneously. In a lateral collision, the side chamber 20 may deploy rapidly, as described above, and thus, lateral movement of the passenger P may be restrained and the side chamber 20 may cover the passenger P together with the main chamber 10 to restrain the passenger P in the seat and protect the passenger P from a secondary injury.

Figure 5:
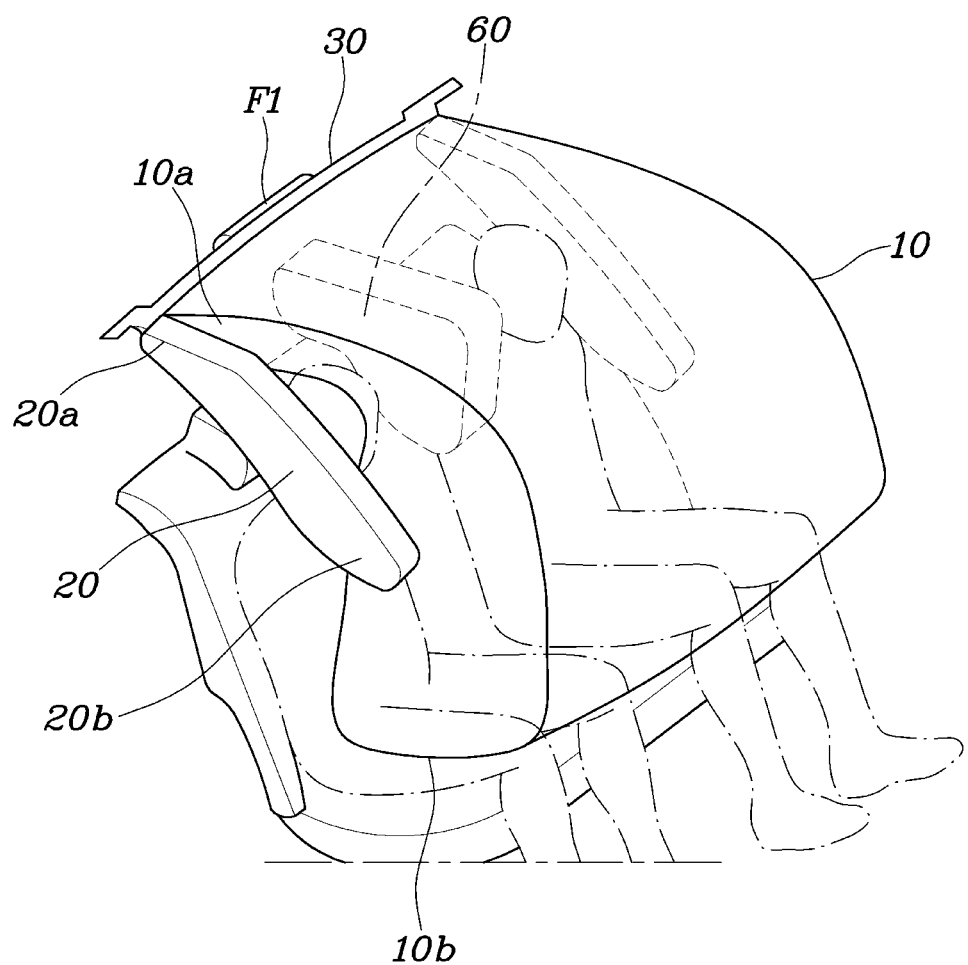
Figure 6:
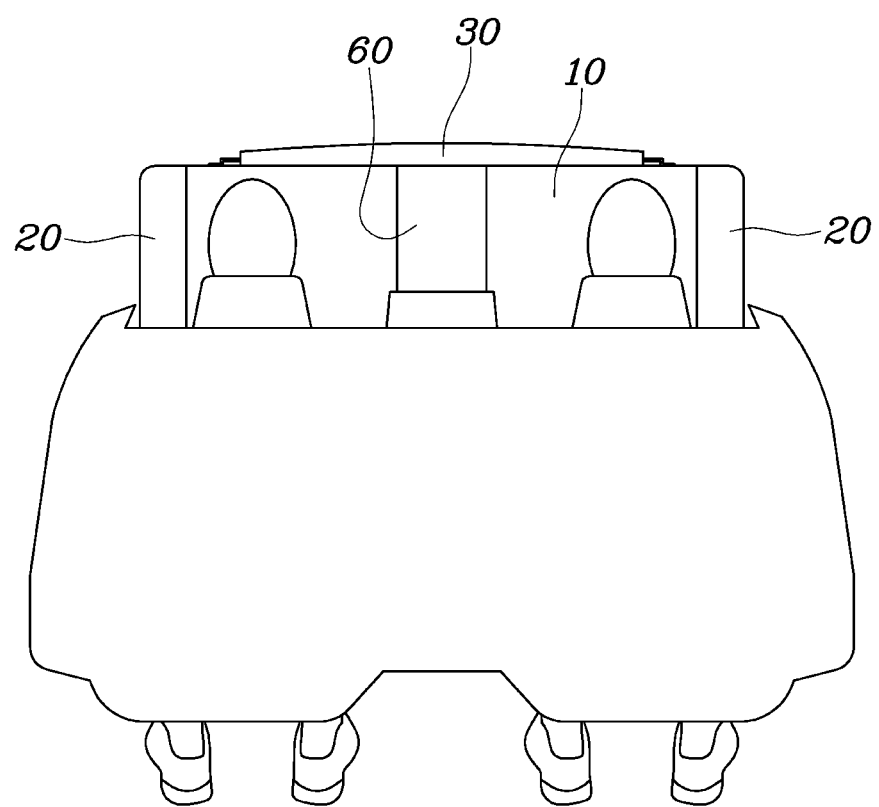

On the other hand, as shown in FIGS. 5 and 6, one or more partition chambers 60 that separate several passengers P in seats may be formed at the center of the main chamber 10. The partition chambers 60 may be connected to the main chamber 10 to expand with the main chamber 10 to prevent the passengers P in the seats from hitting one another or colliding due to the partition chambers 60 that deploy with the main chamber 10 in a vehicle collision. The partition chamber 60 may be connected to the first end 10a of the main chamber 10 and may expand with the main chamber 10. The partition chamber 10 may be elongated in the front-rear direction in the longitudinal direction of the main chamber 10 and may extend downward to be inserted between the passengers P.

Figure 7:
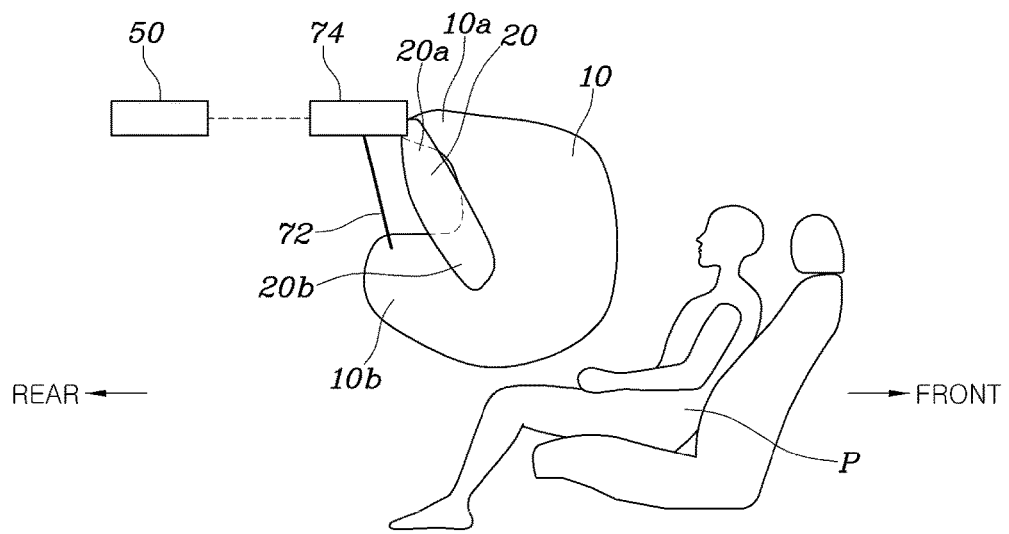

As another exemplary embodiment of the present disclosure, as shown in FIG. 7, the airbag may further include: a retaining tether 72 having a first end connected and fixed to a vehicle body or the first end 10a of the main chamber 10 and a second end connected to the second end 10b of the main chamber 10 to deploy the main chamber 10 downward when the protective airbag 1 deploys; and a tether cutter 74 disposed on the vehicle body or the main chamber 10 to selectively cut the retaining tether 72.

As described above, since the first end 10a and the second end 10b of the main chamber 10 may be connected by the retaining tether 72, when the main chamber 10 deploys, the second end of the main chamber 10 may be pulled by the retaining tether 72 to restrain forward deployment and thus, the deployment direction may be changed downward. In other words, as shown in FIG. 7, the second end 10b of the main chamber 10 does not deploy forward, but may be pulled rearward to be wound by the retaining tether 72 to deploy the main chamber 10 downward.

The retaining tether 72 may be selectively cut by the tether cutter 74, and thus, the shape of the main chamber 10 fully deploying depends on whether the retaining tether 72 is cut by the tether cutter 74. In particular, a seat may be adjusted to face front or rear and the tether cutter 74 may be operated by the controller 50 that receives seat information. Accordingly, when the seat is adjusted to face front, the controller 50 may be configured to operate the tether cutter 74 to cut the retaining tether 72. The controller 50 may be configured to recognize that the seat is adjusted by receiving seat information from a sensor configured to detect motion of the seats.

Figure 8:
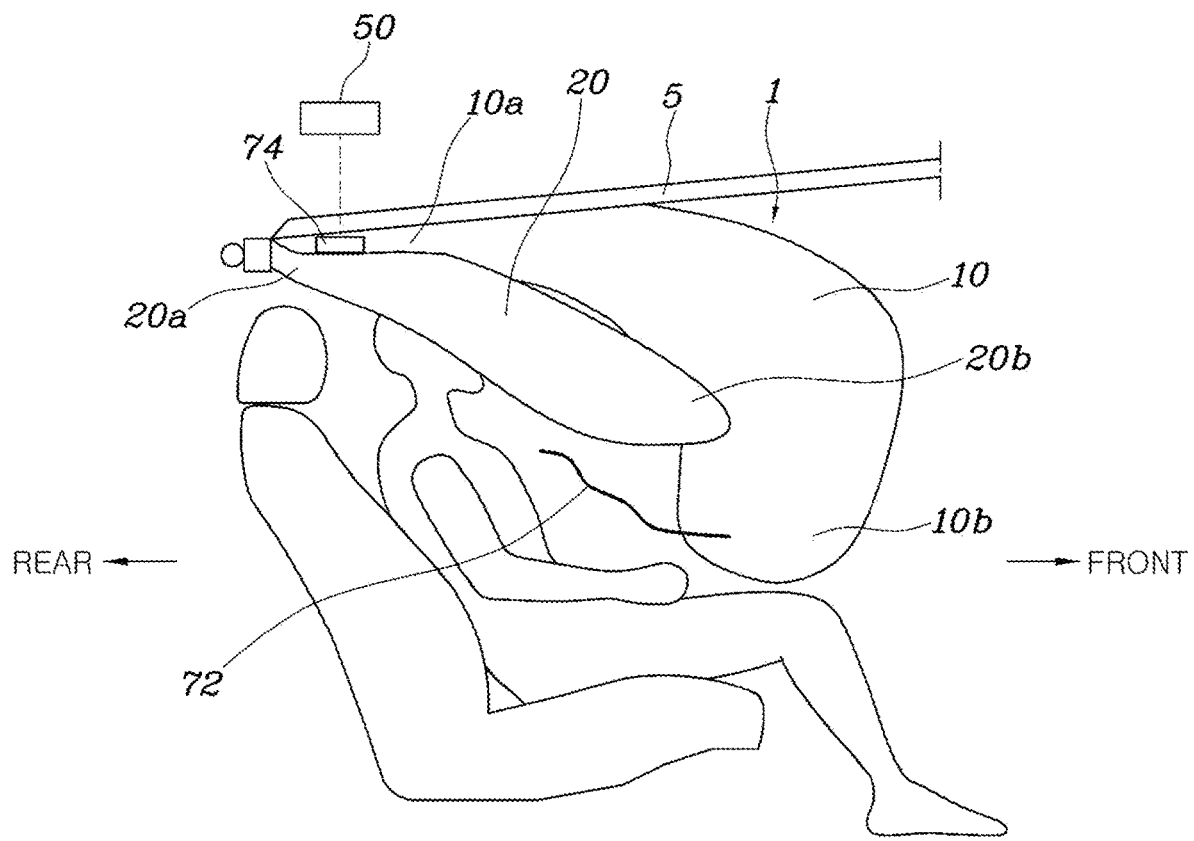
Figure 9:
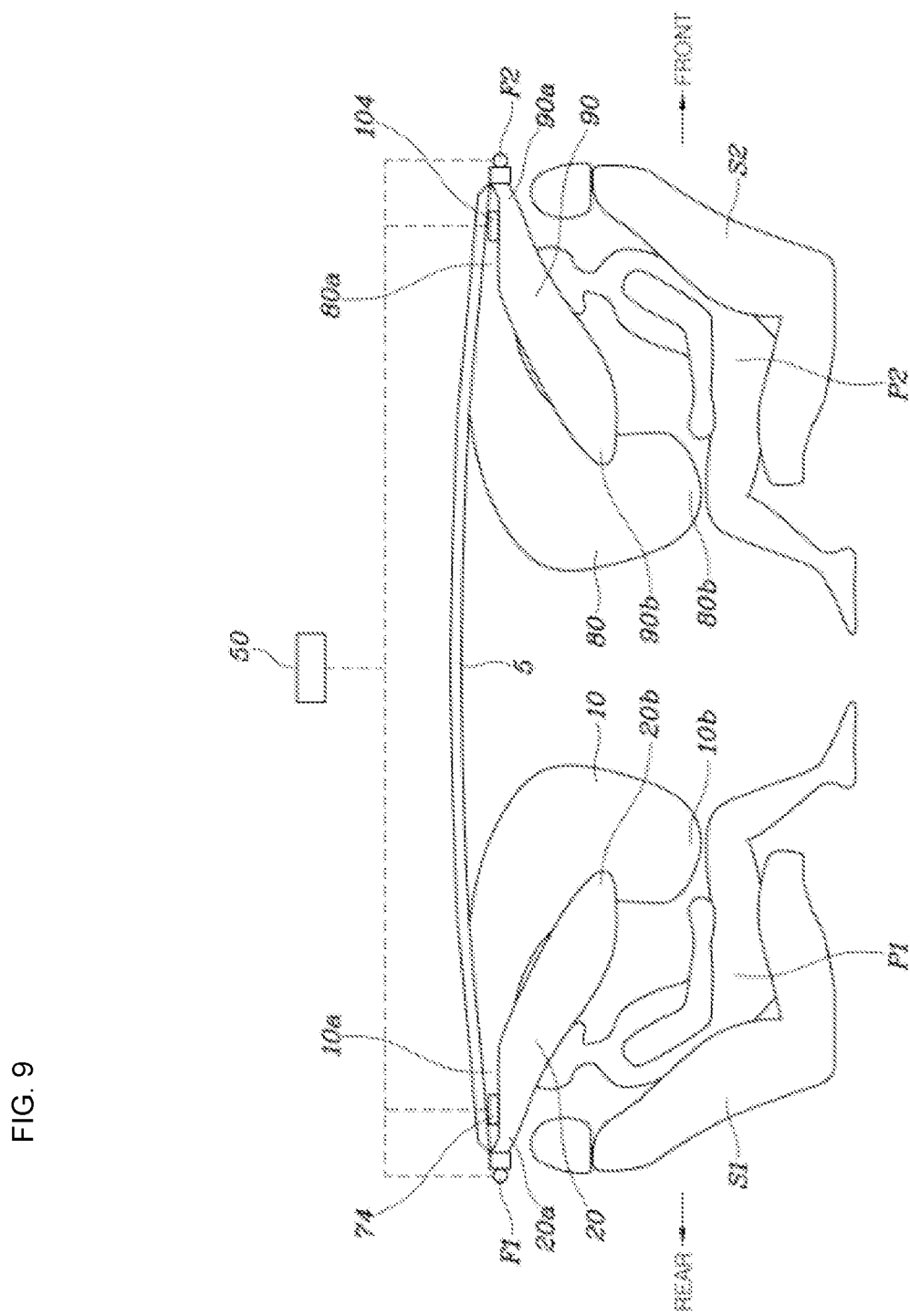

Seats may be adjusted to face front or rear and, in a self-driving vehicle, a seat is not fixed to face the front, but may be freely adjusted to face the rear, and thus, the deployment position of the protective airbag 1 may be adjusted based on the position of the seat. Particularly, when the seat is adjusted to face front, the controller 50 may be configured to operate the tether cutter 74 to cut the retaining tether 72 to deploy the main chamber 10 forward from behind the seat. As shown in FIG. 8, when the seat is adjusted to face front, the retaining tether 72 connected to the main chamber 10 may be cut by the tether cutter 74, and thus, the main chamber 10 may be moved forward from behind the seat and may be in the position in front of the passenger P in the seat, thereby protecting the passenger P.

In contrast, when the seat is adjusted to face rear, the tether cutter 74 may not be operated and the main chamber 10 may be deployed downward by the retaining tether 72, whereby the main chamber 10 is positioned in front of the passenger P in the seat adjusted to face rear. In other words, when the seat is adjusted to face rear, the passenger P in the seat faces rear. When the main chamber 10 deploys forward the passenger P is unable to be protected. Accordingly, as shown in FIG. 7, the retaining tether 72 is not cut and thus, the main chamber 10 may be deployed downward by the retaining tether 72, whereby the main chamber 10 is positioned in front of the passenger P in the seat adjusted to face rear.

As described above, according to the protective airbag 1 of the present disclosure, by changing the deployment direction and the fully-deployed shape of the main chamber 10 by selectively cutting the retaining tether 72, based on the position of a seat, it may be possible to protect the passenger P even when the position of the seat is adjusted.

As another exemplary embodiment of the present disclosure, a plurality of seats may be disposed front and back and may be adjusted to face front or rear, a rear seat S1 and a front seat S2 face each other, the protective airbag 1 may be disposed above and behind the rear seat S1 and an additional airbag 2 that expands to deploy rearward and supports a passenger in the front seat S2 in front of the passenger P2 may be disposed above and ahead of the front seat S2.

In other words, for a self-driving vehicle, seats may not be fixed to face front and may be freely adjusted to face front and rear to allow passengers P2 in the rear seat S1 and the front seat S2 to face each other. Accordingly, the protective airbag 1 (e.g., first protective airbag) is provided to protect the passenger P1 in the rear seat S1 and the additional airbag 2 (e.g., second protective airbag) is provided to protect the passenger P2 in the front seat S2, thereby safely protecting both passengers in the rear seat S1 and the front seat S2.

The additional or second airbag 2 may include: an additional main chamber 80 (e.g., a second main chamber) disposed above and ahead of the front seat S2 and having a first end 80a connected to an inflator F2 to deploy behind a seat when the inflator is operated and a second end 80b bending downward to be positioned in front of the passenger P2 in the front seat S2 when fully deploying; and an additional side chamber 90 (e.g., a second side chamber) having a first end 90a connected to the first end of the additional main chamber 80 to be positioned at a side of the additional main chamber 80 when the inflator F2 is operated and a second end 90b connected to the second end 80b of the additional main chamber 80 and pulling the second end 80b of the additional main chamber 80 forward when the additional main chamber 80 deploys such that the additional main chamber 80 supports the passenger P2 in the front seat S2 in front of the passenger P2. In other words, the additional main chamber 80 deploys rearward from the upward-forward side of the front seat S2 to be positioned in front of the passenger P2 sitting to face the rear, thereby retaining the passenger P2 to prevent the passenger P2 from moving rearward.

The additional side chamber 90 may be disposed at a side of the additional main chamber 80. The additional side chamber 90 may have the first end 90a connected to the first end 80a of the additional main chamber 80 to be supplied with and expanded by gas from the inflator F2 and the second end 90b connected to the second end 80b of the additional main chamber 80 to guide the additional main chamber 80 in a predetermined shape when the additional main chamber 80 fully deploys. Accordingly, the additional side chamber 90 may be formed shorter than the additional main chamber 80. Further, the additional side chamber 90 connected to the additional main chamber 80 may restrain rearward deployment of the additional main chamber 80 and pull the additional main chamber 80 forward, whereby the second end 80b of the additional main chamber 80 may be bent forward and support the passenger P2. The additional airbag 2 including the additional main chamber 80 and the additional side chamber 90 may be configured the same as the protective airbag 1, the protective airbag 1 protects the passenger P1 in the rear seat S1, and the additional airbag 2 protects the passenger in the front seat S2.

Accordingly, with the front seat S2 and the rear seat S1 facing each other, even when the passenger P2 in the front seat S2 is moved rearward by a vehicle collision, the passenger P2 loaded on the additional main chamber 80 may be stably retained since the additional main chamber 80 deploying rearward from ahead of the front seat S2 is positioned in front of the passenger and the additional side chamber 90 pulls rearward and supports the additional main chamber 80.

Figure 10:
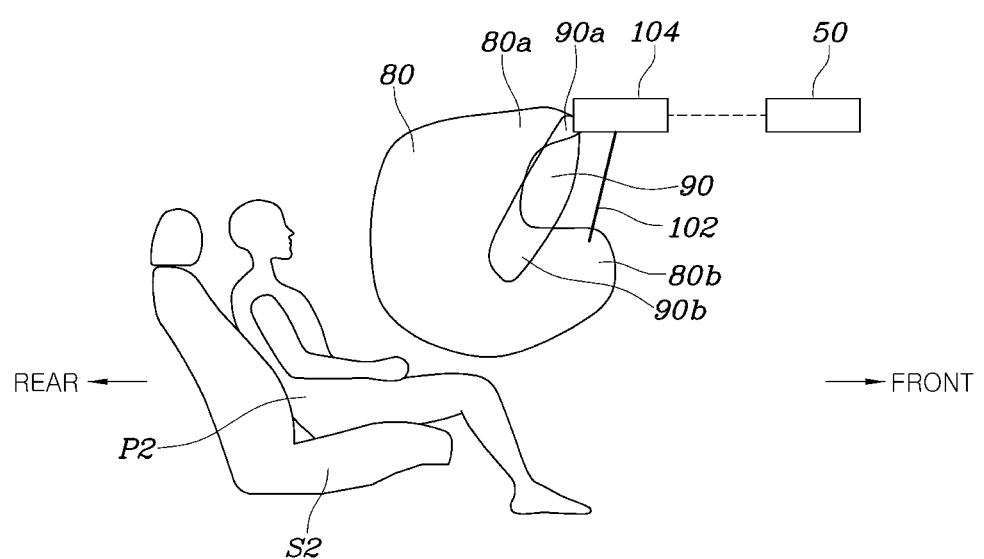

Meanwhile, as shown in FIGS. 10 and 11, the airbag of the present disclosure may further include: an additional retaining tether 102 (e.g., a second retaining tether) having a first end connected to a vehicle body or the first end 80a of the additional main chamber 80 and a second end connected to the second end 80b of the additional main chamber 80 to cause the additional main chamber 80 to deploy downward when the additional airbag 2 deploys; and an additional tether cutter 104 (e.g., a second tether cutter) disposed on the vehicle body or the additional main chamber 80 to cut the additional retaining tether 102. The additional tether cutter 104 may be operated by the controller 50 receiving seat information. When the front seat S2 is adjusted to face the rear, the controller 50 may be configured to operate the additional tether cutter 104 to cut the additional retaining tether 102.

As described above, since the first end 80a and the second end 10b of the additional main chamber 80 may be connected by the additional retaining tether 80, when the additional main chamber 80 deploys, the second end 80b of the additional main chamber 80 may be pulled by the retaining tether 72, and thus, rearward deployment may be retained and the additional main chamber 80 may deploy downward. In other words, as shown in FIG. 10, when the front seat S2 is adjusted to face the front, the additional tether cutter 104 may not be operated and thus, the additional main chamber 80 may be retained by the additional retaining tether 102 to be positioned in front of the passenger P2 in the front seat S2. As described above, when the front seat S2 is adjusted to face the front, the second end 80b does not deploy rearward, but may be pulled forward to be wound by the additional retaining tether 102 to thus deploy the additional main chamber 80 downward.

On the contrary, as shown in FIG. 11, when the front seat S2 is adjusted to face the rearward, the controller 80 may be configured to operate the additional tether cutter 104 to cut the additional retaining tether 102. Accordingly, the additional main chamber 80 may be moved rearward from ahead of the seat and then may be positioned in front of the passenger in the seat, thereby being able to protect the passenger.

The airbag for a vehicle that has the structures described above may be variously applied by combining various exemplary embodiments, and the airbag may be provided for each seat, thereby being able to safely protect passengers in each seat. In particular, since the airbag deploys in different directions to cover a passenger in accordance with the position of the passenger in a seat, the passenger may be safely supported by the airbag. Further, even when the position of a seat is changed and a passenger faces another direction, the position of the airbag may be changed to safely protect the passenger.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. An airbag for a vehicle, comprising:
   a protective airbag including:
   a main chamber disposed above and behind a seat, having a first end connected to an inflator to deploy forward and ahead of the seat when the inflator is operated, and having a second end configured to bend downward when the main chamber fully deploys, such that the main chamber is positioned in front of a passenger in the seat; and
   a side chamber having a first end connected to the first end of the main chamber to be positioned at a side of the main chamber when the inflator is operated and having a second end connected to the second end of the main chamber, wherein the second end of the side chamber is configured to pull the second end of the main chamber rearward when the main chamber deploys, such that the main chamber supports the passenger in front of the passenger, wherein the airbag further includes an airbag housing disposed above and behind the seat, maintaining the protective airbag connected to the inflator therein, and having a guide door that is opened by deployment force of the protective airbag when the inflator is operated, wherein the airbag housing is fixed to a roof frame, and wherein the first end of the main chamber and the first end of the side chamber are connected to each other through a vent and an active vent portion is disposed at the vent to selectively open the vent that is closed.

2. The airbag of claim 1, wherein the main chamber is elongated such that the second end configured to bend downward when the main chamber fully deploys reaches a lower body of the passenger in the seat.

3. The airbag of claim 1, wherein the side chamber is formed shorter than the main chamber and the second end of the side chamber is connected to the second end of the main chamber, such that the side chamber is positioned at a side of the passenger when the main chamber fully deploys.

4. The airbag of claim 1, wherein the guide door is rotatable at a front lower end of the airbag housing, and guides the protective airbag under the protective airbag to deploy in a front direction of the vehicle when the protective airbag deploys.

5. The airbag of claim 1, wherein the airbag housing is elongated to be as long as a lateral width of the seat.

6. The airbag of claim 1, further comprising:
a controller configured to receive vehicle collision information and operate the active vent portion,
wherein when the controller is configured to receive a front-rear collision signal, and operate the active vent portion to open the vent after the main chamber deploys prior to the side chamber.

7. The airbag of claim 1, wherein when a controller receives a lateral collision signal, the controller is configured to operate the active vent portion to open the vent to deploy the main chamber and the side chamber simultaneously.

8. The airbag of claim 1, wherein the active vent portion includes:
a cover that covers and closes the vent;
a wire connected to the cover and holding the cover to cover the vent; and
a cutter disposed on a vehicle body or the protective airbag and operated by a controller to cut the wire.

9. The airbag of claim 1, wherein one or more partition chambers configured to separate several passengers in seats are formed at the center of the main chamber and are connected to the main chamber to expand with the main chamber when the main chamber expands.

10. The airbag of claim 1, further comprising:
a retaining tether having a first end connected and fixed to a vehicle body or the first end of the main chamber and a second end connected to the second end of the main chamber to deploy the main chamber downward when the protective airbag deploys; and
a tether cutter disposed on the vehicle body or the main chamber to selectively cut the retaining tether.

11. The airbag of claim 10, wherein the seat is adjustable to face in a front direction or in a rear of the vehicle, wherein the tether cutter is operated by a controller and when the seat is adjusted to face in the front direction of the vehicle, the controller is configured to operate the tether cutter to cut the retaining tether.

12. The airbag of claim 11, wherein when the seat is adjusted to face rear, the main chamber is deployed downward by the retaining tether without tether cutter operation to position the main chamber in front of the passenger in the seat adjusted to face in the rear direction of the vehicle.

13. The airbag of claim 1, wherein a plurality of seats is disposed in front and back directions of the vehicle,
wherein each of the plurality of seats is adjustable to face in a front direction or in a rear direction of the vehicle,
wherein the plurality of seats is arranged with a front seat and rear seat and facing each other,
wherein the protective airbag is disposed above and behind the rear seat, and
wherein the airbag includes an additional airbag disposed above and ahead of the front seat, expanding to deploy rearward such that a passenger in the front seat is supported by the additional airbag positioned in front of the passenger.

14. The airbag of claim 13, wherein the additional airbag includes:
an additional main chamber disposed above and ahead of the front seat and having a first end connected to an inflator to deploy behind a seat when the inflator is operated and a second end bending downward to be positioned in front of the passenger in the front seat when fully deploying; and
an additional side chamber having a first end that communicates with the first end of the additional main chamber to be positioned at a side of the additional main chamber when the inflator is operated and a second end connected to the second end of the additional main chamber and pulling the second end of the additional main chamber forward when the additional main chamber deploys such that the additional main chamber supports the passenger in the front seat in front of the passenger.

15. The airbag of claim 14, further comprising:
a retaining tether having a first end connected to a vehicle body or the first end of the additional main chamber and a second end connected to the second end of the additional main chamber to cause the additional main chamber to deploy downward when the additional airbag deploys; and
a tether cutter disposed on the vehicle body or the additional main chamber to cut the retaining tether,
wherein the tether cutter is operated by a controller and when the front seat is adjusted to face in the rear direction of the vehicle, the controller is configured to operate the tether cutter to cut the retaining tether.

16. The airbag of claim 15, wherein when the front seat is adjusted to face in the front direction of the vehicle, the additional main chamber is retained by the retaining tether, such that the additional main chamber is positioned in front of the passenger in the front seat.

* * * * *